Patented Oct. 23, 1951

2,572,371

UNITED STATES PATENT OFFICE 2,572,371

PRODUCTION OF FURAN DERIVATIVE

Thomas J. Mooney, Perth Amboy, N. J., assignor to E. I. du Pont de Nemours & Company, Wilmington, Del., a corporation of Delaware No Drawing. Application April 21, 1948,
Serial No. 22,512

1 Claim. (Cl. 260—345)

This invention relates to the production of a furan derivative and, more particularly, it relates to the production of an aminomethyl derivative of furan.

It is an object of this invention to produce a new aminomethyl derivative of furan.

It is another object of this invention to provide a new process for the production of an aminomethyl derivative of furan.

Other objects of the invention will appear hereinafter.

The objects of this invention may be accomplished, in general, by reacting, at a temperature of 10° C. to 40° C., furan with a composition taken from the class consisting of (a) an aqueous solution of hexamethylenetetramine in the presence of a mineral acid taken from the group consisting of hydrochloric acid, sulfuric acid, and phosphoric acid, and (b) an aqueous solution of formaldehyde and an ammonium salt taken from the group consisting of ammonium chloride, ammonium sulfate, and ammonium phosphate, neutralizing the reaction mixture with an alkaline material taken from the group consisting of ammonium hydroxide and alkali metal hydroxides.

In the case where the reaction is carried out with hexamethylenetetramine, the mineral acid functions as a catalyst for the reaction, and in the case where ammonium salt and formaldehyde are used in carrying out the reaction, the acid radical of the ammonium salt functions as a catalyst for the reaction.

The several reactants may be mixed in any order at room temperature (approximately 21° C.) as a result of which an exothermic reaction sets in which may require cooling to maintain the temperature below 40° C.

In general, one mole of furan may be mixed with between 0.25 and 2.0 moles of hexamethylenetetramine in an aqueous solution containing 1 to 8 moles of hydrochloric acid, sulfuric acid, or phosphoric acid. If ammonium salts and formaldehyde are used in place of hexamethylenetetramine, one mole of furan may be mixed with an aqueous solution containing 1 to 4 moles each of the formaldehyde and the ammonium salt taken from the group consisting of ammonium chloride, ammonium sulfate, and ammonium phosphate.

In accordance with the preferred process of this invention, the reaction is carried out at a temperature between 20° C. and 30° C. with one mole furan and either approximately ⅓ mole hexamethylenetetramine and approximately 1⅓ moles of hydrogen chloride in the form of concentrated hydrochloric acid (37% aqueous solution), or approximately 3 moles ammonium chloride and approximately 2 moles formaldehyde in the form of a 37% aqueous solution. In either case, when the reaction is completed and no further heat is given off, the reaction mixture is preferably diluted with water and the solid aminomethyl derivative of furan isolated by neutralization with ammonium hydroxide or alkali metal hydroxides.

Preferably, the reaction is carried out in a reaction mixture containing between 10% and 50% by weight of water. The aqueous reaction mixture may, however, contain greater amounts of water. The reaction will take place readily in a reaction mixture in which water constitutes as much as 90% of said mixture. The solid aminomethyl derivative of furan may be precipitated directly from the reaction mixture by the addition of alkaline material without first diluting the mixture with water. In such case, however, the resulting product is usually contaminated with traces of sticky, oily reaction product and subsequent purification is necessary. Dilution of the reaction product is therefore preferred.

In diluting the reaction mixture prior to neutralization as above described, the amount of water used depends upon the dilution of the reaction mixture. Sufficient water is preferably added that the reaction mixture will contain from 60% to 80% by weight of water. Greater amounts of water may, of course, be added without, however, obtaining any beneficial result.

The process of this invention involves a Mannich type reaction and the aminomethyl furan product of this invention is a furan ammonia Mannich base and appears to consist of a chain or cross-linked structure containing recurring

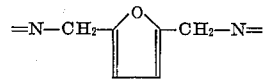

groups. The product has the form of a light tan-colored powder which is insoluble in water, dilute alkaline solutions, methanol, and common organic solvents such as ethanol, propanol, butanol, acetone, ether, dioxane, trichlorethylene, carbon tetrachloride, or the like. The product dissolves readily in dilute acid solutions to give water-soluble acid derivatives analogous to the reactions of amines with an acid. Neutralization destroys these acid derivatives and the product precipitates unchanged. On standing, acid solutions decompose with formation of tarry products. Elemental analyses of the aminomethyl-furan product, which has first been prified by re-precipitation from acid solution, indicate that it has the empirical formula, $C_{37}H_{43}N_5O_8$ (molecular weight 686).

Elemental analyses of two samples gave the following tabulated results:

*Percentage composition by weight*

| | Samples | | Calculated for $C_{37}H_{43}N_5O_8$ |
|---|---|---|---|
| | 1 | 2 | |
| Carbon | 64.46 | 65.10 | 64.80 |
| Hydrogen | 6.66 | 6.48 | 6.32 |
| Nitrogen | 10.41 | 9.94 | 10.21 |
| Oxygen (Diff.) | 18.47 | 18.48 | 18.67 |
| | 100.00 | 100.00 | 100.00 |

The following examples are given to illustrate certain preferred processes for the production of the aminomethyl furan product of this invention, it being understood, of course, that the invention is not to be limited to the specific details given in these examples.

EXAMPLE I

Ammonia chloride, 80 grams (1.5 moles), was mixed with 80.5 grams (1 mole) of 37% formaldehyde in a 500 cc., round-bottom flask equipped with thermometer and agitator. Furan, 34 grams (0.5 mole), was slowly added to this mixture, keeping the reaction temperature between 32° C. and 35° C. by external cooling. When the reaction was completed, the mixture was allowed to agitate for an additional hour and diluted with 125 cc. of distilled water. The product was then neutralized with 260 cc. of 7% ammonium hydroxide solution. The yield, 61.5 grams of light tan-colored furan ammonia Mannich base, was filtered from the reaction mixture. Analyses of this product purified by re-precipitation from a solution thereof in hydrochloric acid, indicate that it has recurring bis(aminomethyl)-furan units and has the approximate empirical formula, $C_{37}H_{43}N_5O_8$.

EXAMPLE II

Hexamine, 56 grams (0.4 mole) was dissolved in 160 grams of 37% hydrochloric acid in a 1-liter, round-bottom flask equipped with thermometer and stirrer. The reaction mixture was cooled to 26° C. and 81.2 grams of furan (1.2 moles) was slowly added, keeping the reaction temperature between 26° C. and 30° C. After the reaction was completed, the mixture was allowed to agitate for an additional hour at room temperature and then diluted with 300 cc. of distilled water. After the product had been neutralized with 121 grams of concentrated ammonium hydroxide dissolved in 250 cc. of distilled water, 89 grams of light tan-colored furan ammonia Mannich base was obtained. Analyses of this product purified by re-precipitation from a solution thereof in hydrochloric acid, indicate that it has recurring bis(aminomethyl)furan units and has the approximate empirical formula, $C_{37}H_{43}N_5O_8$.

EXAMPLE III

In a 500 cc., round-bottom, reaction flask equipped with thermometer and stirrer, 28 grams (0.2 mole) of hexamethylenetetramine was dissolved in 80 grams of 37% concentrated hydrochloric acid. The reaction mixture was cooled to 20° C. and 40.8 grams (0.6 mole) of furan was added slowly. The reaction temperature was controlled between 20° C. and 30° C. by external cooling. After the furan addition was completed, the reaction mixture was agitated for an additional hour, diluted with 250 cc. of water, and neutralized with 2N sodium hydroxide. Approximately 58 grams of light tan-colored reaction product was obtained which appeared to be in all respects similar to the product of Examples I and II.

EXAMPLE IV

Hexamine, 2.8 grams, was dissolved in 6 cc. of 50% sulfuric acid and the resulting solution cooled to approximately 26° C. Five (5) cc. of furan was added to the resulting mixture. On agitation, the furan slowly went into solution. An exothermic reaction took place, necessitating external cooling to keep the reaction temperature below 35° C. When the reaction was completed, the mixture was neutralized with 10% sodium hydroxide solution and the furan Mannich base in the form of a light tan-colored solid isolated by filtration. This product appeared to be identical with the product of Examples I and II.

EXAMPLE V

Ammonium chloride, 53.5 grams (1 mole) was mixed with 80 grams (1 mole) of 37% formaldehyde in a 500 cc. reaction flask equipped with thermometer and stirrer. The mixture was cooled to 26° C. and 34 grams (0.5 mole) of furan was slowly added, keeping the temperature below 30° C. by external cooling. When the furan addition was completed, the reaction was allowed to agitate for 2.75 hours at room temperature. The reaction mixture was then diluted with 250 cc. of water and neutralized with 2N sodium hydroxide. A yield of 50.4 grams of light tan-colored furan ammonia Mannich base was isolated. This product appeared to be identical to the product of Examples I and II.

The furan ammonia Mannich base product of this invention has utility as an acid inhibitor in the pickling of steel. A solution of the product in phosphoric acid functions as a flame-proofing agent for textile goods and as a crease-proofing agent for cotton cloth. It may also be used as a detergent, emulsifying agent, and electroplating addition agent. The following three examples show its utility as a flame-proofing, crease-proofing, and acid inhibiting agent.

EXAMPLE VI

Approximately five (5) grams of furan ammonia Mannich base, as produced in accordance with any of the above five examples, was dissolved in 50 cc. of distilled water containing 3 cc. of 85% phosphoric acid. Strips of cotton cloth were impregnated with this solution, squeezed to remove excess solution, and dried for one hour in an oven at 120° C. to 125° C. The resulting cloth was found to be flameproof in that it charred but did not ignite when subjected to a flame. Portions of the cloth were laundered for one minute in soapy water at 30° C. The laundered material showed some flameproofing characteristics and was not readily ignited.

EXAMPLE VII

A sample of cloth, impregnated with the solution of Example VI, was dried at 65° C. in an oven in the presence of ammonia gas. A one-inch square sample of this treated cloth was folded in the middle, pressed for one minute with a one thousand gram weight and allowed to recover for one-half minute. The angle through which the cloth unfolded was measured. Untreated material gave an angle of 90°, whereas the treated material gave an angle of 120°.

EXAMPLE VIII

Two strips of mild steel, one inch by two inches, were sanded, degreased, weighed, and submerged for twenty-one and one-quarter hours in 400 cc. portions of the following solutions: (a) 10% hydrochloric acid, and (b) 10% hydrochloric acid containing one gram of furan ammonia Mannich base of Example I. On drying and reweighing, the strips from solution (a) had lost 0.787 gram, whereas the strips from solution (b) had lost 0.065 gram.

It was known, prior to this invention, to react 2-methyl furan with ammonium chloride and formaldehyde. The following example is given to show that such previously known reaction produces an entirely different type of product than the process of the present invention.

EXAMPLE IX

An aqueous solution of ammonium chloride weighing 251 grams and containing 64% $NH_4Cl$ solution was agitated with 63 grams (2 moles) of paraformaldehyde at room temperature for approximately one hour. 2-methyl furan, 83 grams (1 mole), was added to the above slurry, keeping the reaction temperature at approximately 30° C. A mild exothermic reaction took place during this addition. After all the 2-methyl furan was added, the reaction mixture was allowed to stir for an additional hour at room temperature. The resulting mixture, which still contained some undissolved material, was diluted with 175 cc. of water and neutralized with 121.5 grams of 28% ammonia diluted with approximately 250 cc. of water. Some oil separated on neutralization and was removed. An approximately equivalent quantity of oil was then isolated from the solution by extraction with methylene chloride. The combined product fractions distilled at 130° C. to 135° C. at 2 to 5 mm. giving 43.8 grams of product. Cryoscopic molecular weight determinations gave a value of 196. Only a trace of solid reaction product was obtained.

Throughout the specification and claim, any reference to parts, proportions, and percentages, refers to parts, proportions, and percentages by weight unless otherwise specified.

Since it is obvious that many changes and modifications can be made in the above-described details without departing from the nature and spirit of the invention, it is to be understood that the invention is not to be limited to said details except as set forth in the appended claim.

What is claimed is:

A process for the production of a furan ammonia Mannich base which comprises reacting, at a temperature of 32° C. to 35° C., about 0.5 mole of furan with an aqueous solution of formaldehyde containing about 1.0 mole of formaldehyde and about 1.5 moles of ammonium chloride, after completion of the reaction agitating the mixture for about one hour, diluting the mixture with distilled water, neutralizing the product with a 7% ammonium hydroxide solution, and filtering the furan ammonia Mannich base from the reaction mixture.

THOMAS J. MOONEY.

REFERENCES CITED

The following references are of record in the file of this patent:

Levvy: J. Chem. Soc (1938), p. 1053.

Morton: The Chemistry of Heterocyclic Compounds, p. 4, McGraw-Hill Book Co., N. Y., 1946.

Lukasiewicz et al.: J. Am. Chem. Soc., vol. 68, July 1946, pp. 1389–1390.

Hartough: J. Am. Chem. Soc., vol. 69, June 1947, pp. 1355, 1358.

Holdren et al.: J. Am. Chem. Soc., vol. 68, pp. 1198–1199.

Adams et al.: Organic Reaction, vol. 1, pp. 304–305, John Wiley & Sons Inc., New York.

Witmore: Organic Chemistry, p. 226, D. Van Nostrand Co., N. Y.